(12) United States Patent
Zimmermann et al.

(10) Patent No.: US 6,800,125 B2
(45) Date of Patent: Oct. 5, 2004

(54) OXIDE METALLIC EFFECT MATERIALS

(75) Inventors: Curtis J. Zimmermann, Cold Spring, NY (US); Steven A. Jones, Budd Lake, NJ (US)

(73) Assignee: Engelhard Corporation, Iselin, NJ (US)

( * ) Notice: Subject to any disclaimer, the term of this patent is extended or adjusted under 35 U.S.C. 154(b) by 32 days.

(21) Appl. No.: 10/318,201

(22) Filed: Dec. 13, 2002

(65) Prior Publication Data

US 2004/0112253 A1 Jun. 17, 2004

(51) Int. Cl.$^7$ .................................................. C04B 3/06
(52) U.S. Cl. ..................... 106/415; 106/403; 106/404; 106/417; 106/418; 106/442; 106/456; 106/480; 428/403; 428/404
(58) Field of Search .................................. 428/403–404; 106/403–404, 415, 417, 418, 442, 456, 480

(56) References Cited

U.S. PATENT DOCUMENTS

| 4,328,042 A | | 5/1982 | Ostertag et al. | |
| 4,954,175 A | * | 9/1990 | Ito et al. | 106/417 |
| 6,325,847 B1 | * | 12/2001 | Christie et al. | 106/417 |

* cited by examiner

*Primary Examiner*—C. Melissa Koslow
*Assistant Examiner*—Shalie A. Manlove
(74) *Attorney, Agent, or Firm*—Melanie L. Brown

(57) ABSTRACT

A color effect material is described as composed of a plurality of encapsulated substrate platelets in which each platelet is encapsulated with a highly reflective silver layer which acts as a reflector to light directed thereon and an iron oxide layer.

15 Claims, No Drawings

OXIDE METALLIC EFFECT MATERIALS

BACKGROUND OF THE INVENTION

The provision of metallic effects in surface coatings, plastics coloration, cosmetic preparations and the like is well known. To achieve this effect, one approach has been to disperse both a metallic pigment and a transparent colored pigment in the composition. The metallic pigment is usually aluminum flake and the colored pigment can be, for instance, iron oxide. The art has also combined the two pigments into a single entity by precipitating the colored material on the aluminum flake.

The precipitation of, for instance, iron oxide on the aluminum flake was often carried out from an aqueous solution but that gave rise to various difficulties. Aluminum readily reacts in aqueous media, very dilute solutions of the iron oxide were required, complexing additives were necessary and the procedure had to be carried out in a limited pH range.

An alternate, non-aqueous procedure is described in U.S. Pat. No. 4,328,042. Here, iron pentacarbonyl is oxidized to iron oxide and carbon dioxide in a fluidized bed of the aluminum flake with oxygen at elevated temperature. To obtain reproducible results, the carbonyl cannot exceed 5 volume percent of the fluidizing gas. The use of the low concentration carbonyl and fluidized bed operation are obvious drawbacks of this approach.

It is desirable to provide a metallic oxide color effect material which has the same or better pigment properties as the products just mentioned but without encountering the production and materials limitations of that prior art. The present invention is directed to satisfying that desire.

SUMMARY OF THE INVENTION

The present invention provides an oxide metallic color effect material comprising a platelet-shaped substrate encapsulated with a highly light reflective first layer of silver and a layer of iron oxide. The product, where necessary, can be given a post-treatment for specific attributes such as weather stability, polymeric dispersability and cosmetic compatibility. The method of producing the effect material is also a part of this invention.

DESCRIPTION OF THE INVENTION

It is an object of the present invention to provide novel oxide metallic effect materials which can also be prepared in a reliable, reproducible and technically efficient manner. This object is achieved by an effect material comprising a platelet-shaped substrate coated with (a) a highly light reflective first layer of silver; and (b) an iron oxide layer.

Any encapsulatable smooth platelet can be used as the substrate in this invention. Examples of usable platelets include mica, aluminum oxide, bismuth oxychloride, boron nitride, glass flake, iron oxide-coated glass flake, titanium oxide-coated glass flake, iron oxide-coated mica, silicon dioxide and titanium dioxide-coated mica. The size of the platelet-shaped substrate is not critical per se and can be adapted to the particular use. In general, the particles have average largest major dimensions of about 5–250 microns, in particular 5–100 microns. Their specific free surface area (BET) is in general from 0.2 to 25 $m^2/g$.

The degree of reflectivity for the first encapsulating layer, the highly reflective layer, should be at least about 75% and is preferably at least about 90% reflectivity. This layer is constituted by highly reflective silver.

The thickness of the first layer is not critical so long as it is sufficient to make the layer highly reflective. If desirable, the thickness of the first layer can be varied to allow for some selective transmission of light. The mass percent of this coating can vary considerably because it is directly related to the surface area of the particular substrate being utilized and the thickness necessary to achieve the desired reflectivity. In general, the silver thickness should be at least about 5 nm, preferably from about 10 to 75 nm. A thickness of the silver layer outside of the above-mentioned ranges will typically be either completely opaque or allow for substantial transmission of light.

As a result of the high reflectivity, the silver encapsulated substrate is substantially opaque and much more light is reflected than with conventional effect pigments. The amount of fight reflected in the case of, for instance, iron oxide-coated mica is on the order of about 18% whereas the amount of light in the effect pigment of the instant invention is on the order of 35%.

The effect material of the present invention contains an iron oxide layer directly encapsulated onto the first encapsulating layer. The thickness of this layer can vary considerably. As the thickness increases, interference colors are realized. In general, the layer thickness is about 40 to 200 nm, and preferably about 60 to 180 nm.

If desired, an additional outer layer can be provided. The optional outer encapsulating layer, when present, is a material providing a transparency of about 25–75% transmission. More preferably, one would prefer to have about 40–60% transparency for the outer encapsulating layer. The degree of reflectivity and transparency for the different layers can be determined using a variety of methods such as ASTM method E1347-97, E1348-90 (1996) or F1252-89 (1996), all of which are substantially equivalent for the purposes of this invention.

The material employed as the outer layer can be silver, gold, platinum, palladium, rhodium, ruthenium, osmium, iridium and alloys thereof. Alternatively, the outer layer may also be a metal oxide provided that it is not iron oxide, and may also constitute a nitride or carbide.

The effect materials of the invention are notable for multiple encapsulation of the platelet-shaped substrate. In one embodiment, the first layer and the iron oxide layer are further encapsulated by a selectively transparent outer layer that allows for partial reflection of light directed thereon. Preferably, the outer encapsulating layer is selected from the group consisting of silicon, chromium oxide, a mixed metal oxide, titanium dioxide, titanium nitride and aluminum. More preferably, the outer layer is one or more of the precious metals or alloys.

The optional outer layer is, of course, a part of the optical package. Its thickness can vary but must always allow for partial transparency. For instance, the layer has a preferable thickness of about 5 to 20 nm for silicon; about 2 to 15 nm for aluminum; about 1–15 nm for titanium nitride; about 10 to 60 nm for chromium oxide; about 10–100 nm for titanium dioxide; about 5 to 60 nm for a mixed metal oxide, about 5 to 20 nm for silver; about 3 to 20 nm for gold; about 3–20 nm for platinum; and about 5 to 20 nm for palladium. The metal alloys generally have a similar film thickness compared to the pure metal. It is recognized that a film thickness out of the above range may be applicable depending on the desired effect.

All the encapsulating layers of the effect material of the invention are altogether notable for a uniform, homogeneous, film-like structure that results from the manner of preparation according to the invention.

One advantage of the present invention is that one does not have to start with a traditional metal flake which may have structural integrity problems, hydrogen outgassing problems and a host of other perceived issues (pyrophoric and environmental concerns) typically associated with metal flakes. The substrate provides structural integrity and the silver used in this invention is much more chemically stable than aluminum and generally prefers to be in its non-oxidized metallic ground state. Furthermore, silver can maximize the chromaticity of the reflected color(s) of the end product. In addition, when silver is used as the final (outer) layer of the particle, it may impart electrical conductivity to the effect material, which may be desirable in some applications such as powder coatings.

While the metal layers can be deposited by any known means, they are preferably deposited by electroless deposition or reduction and the non-metal layers preferably by aqueous or non-aqueous sol-gel deposition. An advantage of electroless deposition (Egypt. J. Anal. Chem., Vol. 3, 118–123 (1994)) is that it is a worldwide established chemical technique, not requiring cumbersome and expensive infrastructure compared to other techniques. The electroless deposition technique also allows one to control the degree of reflectivity of light quite accurately and easily by varying the metal film thickness. Additionally, the known procedures are generalized procedures capable of being utilized for coating a variety of surfaces. Furthermore, a layer of iron oxide can also be deposited onto any of the substrates by chemical vapor deposition from an appropriate precursor (The Chemistry of Metal CVD, edited by Toivo T. Kodas and Mark J. Hampden-Smith; VCH Verlagsgesellschaft mbH, D-69451 Weinheim, 1994, ISBN 3-527-29071-0) or in an aqueous system utilizing a precursor such as iron nitrate.

The products of the present invention are useful in automotive, cosmetic, industrial or any other application where metal flake, pearlescent pigments or absorption pigments are traditionally used.

In the novel process for preparing the coated platelet-like substrates, the individual coating steps are each effected by known procedures such as by electroless deposition or hydrolysis/condensation of suitable starting compounds in the presence of the substrate particles to be coated. For instance, silver can be deposited from reduction of aqueous salts of the metal, such as $AgNO_3$. Silicon dioxide can be deposited from silicon tetraalkoxides such as tetraethoxysilane, bases such as sodium silicate and halide silanes such as silicon tetrachloride; titanium dioxide from tetraalkoxides such as titanium isopropoxide and titanium tetraethoxide, halide compounds such as titanium tetrachloride and sulfate compounds such as titanium sulfate, titanium nitride from titanium tetrachloride, tetrakis (diethylamido)titanium (TDEAT) and tetrakis (dimethylamido)-titanium (TDMAT); iron oxide from iron carbonyl, iron sulfate, iron nitrate and iron chloride; and chromium oxide from chromium carbonyl and chromium chloride.

In general, the synthesis of the color effect material can be as follows: a platelet material such as mica is suspended while stirring in an aqueous medium. The platelet substrate acts as a carrier substrate. It may, but usually will not, have a contribution or effect on the final optical properties of the particulate. To the suspension is added a metal precursor capable of depositing silver on the substrate by electroless deposition, along with a suitable reducing agent. The resulting highly reflective silver metal coated substrate is filtered and washed. An aqueous solution of an iron salt is added and the pH is changed to deposit the iron oxide on the reflecting layer. Then to the aqueous medium, a metal solution for electroless deposition is added as described above allowing for the deposition of a selectively transparent metal coating. The final particulate product is washed and dried.

The metallic oxide color effect materials of the invention are advantageous for many purposes, such as the coloring of paints, printing inks, plastics, glasses, ceramic products and decorative cosmetic preparations. Their special functional properties make them suitable for many other purposes. A product with a conductive outerlayer, for example, could be used in electrically conductive or electromagnetically screening plastics, paints or coatings or in conductive polymers. The conductive functionality of these effect materials makes them have great utility for powder coating applications.

Products of this invention have an unlimited use in all types of automotive and industrial paint applications, especially in the organic color coating and inks field where deep color intensity is required. For example, these effect pigments can be used in mass tone or as styling agents to spray paint all types of automotive and non-automotive vehicles. Similarly, they can be used on all clay/formica/wood/glass/metal/enamel/ceramic and non-porous or porous surfaces. The effect pigments can be used in powder coating compositions. They can be incorporated into plastic articles geared for the toy industry or the home. These effect pigments can be impregnated into fibers to impart new and esthetic coloring to clothes and carpeting. They can be used to improve the look of shoes, rubber and vinyl/marble flooring, vinyl siding, and all other vinyl products. In addition, these colors can be used in all types of modeling hobbies.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a well-rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282–591; with regard to paints: C. H. Hare, Protective Coatings, Technology Publishing Co., Pittsburgh (1994), particularly pages 63–288. The foregoing references are hereby incorporated by reference herein for their teachings of ink, paint and plastic compositions, formulations and vehicles in which the compositions of this invention may be used including amounts of colorants. For example, the effect pigment may be used at a level of 10 to 15% in an offset lithographic ink, with the remainder being a vehicle containing gelled and ungelled hydrocarbon resins, alkyd resins, wax compounds and aliphatic solvent. The metallic effect pigment may also be used, for example, at a level of 1 to 10% in an automotive paint formulation along with other pigments which may include titanium dioxide, acrylic lattices, coalescing agents, water or solvents. The effect pigment may also be used, for example, at a level of 20 to 30% in a plastic color concentrate in polyethylene.

In the cosmetic field, the effect materials can be used in all cosmetic and personal care applications subject, of course, to all regulatory requirements. Thus, they can be used in hair sprays, face powder, leg-makeup, insect repellent lotion, mascara cake/cream, nail enamel, nail enamel remover, perfume lotion, and shampoos of all types (gel or liquid). In addition, they can be used in shaving cream (concentrate for aerosol, brushless, lathering), skin glosser stick, skin makeup, hair groom, eye shadow (liquid, pomade, powder, stick, pressed or cream), eye liner, cologne stick, cologne, cologne emollient, bubble bath, body lotion (moisturizing, cleansing, analgesic, astringent), after shave lotion, after bath milk and sunscreen lotion.

For a review of cosmetic applications, see Cosmetics: Science and Technology, 2nd Ed., Eds: M. S. Balsam and Edward Sagarin, Wiley-Interscience (1972) and deNavarre, The Chemistry and Science of Cosmetics, 2nd Ed., Vols 1 and 2 (1962), Van Nostrand Co. Inc., Vols 3 and 4 (1975), Continental Press, both of which are hereby incorporated by reference.

Some illustrative examples of the invention will now be set forth. In these, as well as throughout this specification and claims, all parts and percentages are by weight and all temperatures are in degrees Centigrade, unless otherwise indicated.

EXAMPLE 1

One hundred grams of 100 micron glass flakes (100 micron average major dimension) is placed in a 1 liter beaker equipped with a magnetic stir bar and containing 393 grams of a 2% dextrose solution. The slurry is stirred at room temperature.

To the slurry is rapidly added a solution which is prepared as follows: 7.87 grams of silver nitrate crystals are dissolved into 375 ml distilled water using a magnetic stirrer. A 29% solution of ammonium hydroxide is added dropwise to the beaker resulting in a brown precipitate which redissolves at a higher concentration of the ammonium hydroxide solution. At the point where the solution becomes clear again, 5 extra drops of the ammonium hydroxide solution is added to ensure excess.

Several changes in the shade of the slurry occur as the reaction proceeds. After 15 minutes of stirring, the supernatant liquid is tested for silver ion by the addition of a few drops of concentrated hydrochloric acid. The test is a visual assessment of any precipitate and/or turbidity of which none is found. The slurry is filtered and rinsed several times with distilled water and the presscake is dried at 100° C. to a constant mass. The dried sample is a lustrous, opaque and silver colored material.

The resulting silver coated borosilicate flakes (0.9 kg; average particle size 100 microns) are loaded into a horizontal cylindrical mechanical mixer equipped with mixing blades on a cantilever shaft. A sparger is introduced through the side of the reactor for introduction of reactants. The reactor is heated to 200° C. and nitrogen is added at 168 standard cubic feet per hour (SCFH) through the door end of the reactor. Nitrogen is bubbled through a sealed reservoir of iron pentacarbonyl (IPC) at 5 SCFH resulting in an addition rate of 0.32 g/min of IPC. This reagent flow is combined with an additional 238 SCFH of nitrogen as it enters the sparger which gives a total sparger gas flow of 243 SCFH. The run is continued for 5 hrs and color progression advances with the iron oxide layer thickness. A sample is periodically removed from the reactor demonstrating the color progression as a function of time, exhibiting colors ranging from bronze, copper and russet to golden green.

EXAMPLE 2

125 grams of silver coated glass flake (produced as set forth in Example 1) is slurried in 300 ml distilled water in a 1L round-bottom flask at 300 rpm and heated to 50° C. Then 300 ml of 0.19 M $Fe(NO_3)_3.9H_2O$ is added at 0.3 ml/min. while maintaining a pH of 4.0 with 5% $NH_4OH$. At the end of the addition (approx. 16 hours), the sample is heated to 90° C. for 4 hours. The sample is then filtered hot, washed and dried at room temperature. The sample exhibits a unique golden bronze color.

EXAMPLE 3

In a 3 l flask, 200 g of the product prepared in Example 1 is slurried in 500 ml of distilled water and heated to 75° C. The pH is lowered to 5 using 15% acetic acid. A solution of 22.5% $Fe(NO_3)_3.9H_2O$ is added at 0.25 ml/min. Once the pH reached 3.5, 10% NaOH is used to hold the pH constant. Approximately 400 ml of the iron(III) nitrate solution is added. The resulting sample is filtered, washed, and dried at 200° C. This quantity of iron oxide is calculated to achieve a highly reflective gold colored effect material.

EXAMPLE 4

Example 3 is repeated except that approximately 600 ml of the iron(III) nitrate solution is added. The resulting sample is filtered, washed, and dried at 200° C. This amount of iron oxide is designed to realize a highly reflective golden orange colored effect material.

EXAMPLE 5

Example 3 is repeated except approximately 800 ml of the iron(III) nitrate solution is added. The resulting sample is filtered, washed, and dried at 200° C. The quantity of iron oxide is designed to yield a highly reflective golden orange colored effect material.

EXAMPLE 6

591.0 grams of RCFFX-1045 glass flake from Nippon Sheet Glass is added to a 5 liter Morton flask equipped with a mechanical stirrer. To the flask is added 2.36 liters of distilled water and gentle stirring is initiated. A solution of 9.45 grams of $SnCl_2.2H_2O$, 8.0 mls. of 1:1 HCl and 142 mls. of distilled water is added to the slurry. After 1 hours, the slurry is filtered through a Buchner funnel and reclaimed as a wet press cake. The cake is transferred to a 5 liter Morton flask equipped with gentle mechanical stirring containing a solution of 191.0 grams of dextrose in 1.90 liters of distilled water and maintained at 20–25° C. A solution containing 190.54 grams of $AgNO_3$, 350 mls. of distilled water, and 472.8 grams of 50% 2-amino-2-methyl-1-propanol is added quickly into the flask. The reaction flask is allowed to stir for 1 hour at 20–25° C. in which a highly lustrous coated glass flake is observed in the slurry. The slurry is filter through a Buchner funnel and dried resulting in a lustrous silver coated glass flake.

EXAMPLE 7

The silver coated glass flake prepared in Example 6 is further processed in an externally heated fluidized bed reactor made of stainless steel having a diameter of 15 cm and a height of 152 cm, and equipped with a sintered metal bottom plate (fluidization plate) and porous metal filters. The fluidization gas is delivered to the reactor through the bottom sintered metal plate. Reactants and additional fluidization gases are additionally introduced into the reactor through side inlet ports.

More, particularly, 450 grams of silver coated glass flake prepared in Example 6 having an average particle size of 45 microns (major dimension) is placed in the bottom of the fluidized bed reactor on top of the sintered metal distributor plate. Nitrogen fluidization gas is introduced through the sintered metal bottom plate at ≈150 standard cubic feet per hour (SCFH) resulting in aerosolization of the particulate substrate. An additional 1 SCFH of oxygen is added to the fluidization gas to provide a reactive atmosphere for the reagents. The fluidized bed reactor is electrically heated to 200° C. Nitrogen is bubbled through a sealed reservoir of iron pentacarbonyl (IPC) at 5 SCFH, combined downstream with an additional 70 SCFH of nitrogen and enters the fluidized bed reactor from a side port. The run is continued for 12 hours to allow for color progression advancement with the increasing iron oxide layer thickness. A sample is periodically removed from the reactor to assess the color progression as a function of time. Under the above conditions, the IPC is added at approximately 0.3 grams/minute and the concentration is 3–4% by weight in the nitrogen carrier gas. Due to the temperature of the reactor, gas composition and the surface chemistry of the silver coated glass flake, the IPC is decomposed to deposit species of iron oxide/hydroxide on the surface of the aerosolized particulate. The silver coated glass flake is encapsulated with a layer of IPC decomposition products.

EXAMPLE 8

100 grams of silver coated glass flake (produced as set forth in Example 6) is slurried in 600 ml distilled water in a 1 liter round-bottom flask stirred at 300 rpm and heated to 50° C. To the flask 300 ml of 0.19 M $Fe(NO_3)_3.9\ H_2O$ is added at 0.3 ml/min. while maintaining a pH of 4.0 with 5% $NH_4H$. At the end of the addition (approx. 16 hours), the sample is heated to 90° C. for 4 hours. The sample is then filtered hot, washed and dried at room temperature.

EXAMPLE 9

A kilogram of product produced in Example 8 is added to a 6 liter beaker equipped with mechanical stirring. To the beaker is added 3.43 liters of distilled water and the suspension is gently stirred. A colloidal solution of 4.91 grams of $SnCl_2 2H_2O$ in ½ liter of distilled water is poured into the beaker and stirred for 10 hours. The suspension is then filtered through a Buchner funnel and the wet presscake is transferred to a 8 liter beaker equipped with a mechanical stirrer which contained a solution of 27.0 grams of dextrose in 4.72 liters of distilled water at room temperature. The suspension is stirred for 1 hour. A solution of 26.53 grams of $AgNO_3$, 120 mls. of distilled water, and 77.0 grams of 50% 2-amino-2-methyl-1-propanol is poured into the suspension and stirred for 300 minutes at room temperature. The suspension is filtered on a Buchner funnel and dried in an oven at 120° C. oven.

EXAMPLE 10–12

An oxide metallic effect material prepared according to one of examples 1, 6 and 8 is incorporated into polypropylene step chips at 1% concentration. The step chips are appropriately named since they have graduating thickness at each step across the face of the chip. The graduating steps allow one to examine the different effect of the effect material based on polymer thickness.

EXAMPLE 13–15

An oxide metallic effect material prepared according to one of examples 1, 6 and 8 is incorporated into a nail enamel. 10 g of the CEM is mixed with 82 g of suspending lacquer SLF-2, 4 g lacquer 127P and 4 g ethyl acetate. The suspending lacquer SLF-2 is a generic nail enamel consisting of butyl acetate, toluene, nitrocellulose, tosylamide/formaldehyde resin, isopropyl alcohol, dibutyl phthalate, ethyl acetate, camphor, n-butyl alcohol and silica and 127P is a moderately viscous, nitrocellulose lacquer containing butyl acetate, toluene, nitrocellulose, tosylamide/formaldehyde resin, isopropyl alcohol, dibutyl phthalate, ethyl acetate, camphor, n-butyl alcohol and methoxypropanol acetate.

EXAMPLE 16–18

In a similar fashion, an oxide effect material prepared according to one of examples 1, 6 and 8 is incorporated into a non-nitrocellulose based nail enamel. 10 g of the effect pigment is mixed with 82 g of Avalure AC 315 polymer, an acrylic polymer in ethanol, and acetone used in place of nitrocellulose.

EXAMPLE 19–20

A coating composition containing 10% by weight oxide effect material from example 1 or example 6 is sprayed in a polyester TGIC powder coating from Tiger Drylac using a PGI corona Gun #110347. The effect material is mixed in a clear polyester system and sprayed over a RAL 9005 black powder sprayed base. The effect pigment is highly attracted to the ground metal panel. Additionally, due to its high affinity to orient closely to the surface, it produces a finish that is high in distinctness of image (DOI). It does not require an additional clear coat to reduce protrusion often caused by traditional pearlescent (effect) and metal flake pigments.

EXAMPLE 21–22

A 10% dispersion of the oxide metallic effect material prepared according to example 1 or example 8 is mixed into a clear acrylic urethane basecoat clearcoat paint system DBX-689 (PPG) along with various PPG tints to achieve desired color. The tint pastes consist of organic or inorganic colorants dispersed at various concentrations in a solvent-borne system suitable with the DMD Deltron Automotive Refinish paint line from PPG. The complete formulation is sprayed using a conventional siphon feed spraygun onto 4×12 inch (about 10×30 cm) curved automotive type panels supplied by Graphic Metals. The panel is clear coated with PPG 2001 high solids polyurethane clear coat and air dried.

Various changes and modifications can be made in the process and products of the invention without departing from the spirit and scope thereof. The various embodiments disclosed herein were for the purpose of illustration only and were not intended to limit the invention.

What is claimed is:

1. A color effect material comprising a platelet-shaped substrate sequentially encapsulated with a first homogeneous layer of silver, a second homogeneous layer of iron oxide directly on the silver layer, and wherein the second layer is encapsulated by an outer layer that is selectively transparent to light directed thereon.

2. The color effect material of claim 1, wherein the substrate is selected from the group consisting of mica, aluminum oxide, bismuth oxychloride, boron nitride, glass flake, iron oxide-coated mica or glass, silicon dioxide and titanium dioxide-coated mica or glass.

3. The color effect material of claim 1, wherein the first silver layer is an electroless silver deposition layer.

4. The color effect material of claim 1, wherein the substrate is platelet-shaped mica or glass.

5. The color effect material of claim 4, wherein the substrate is platelet-shaped mica.

6. The color effect material of claim 4, wherein the substrate is platelet-shaped glass.

7. A method of making a color effect material comprising: first coating a platelet-shaped substrate with a first encapsulating homogeneous layer of silver, secondly, encapsulating the first layer with an iron oxide homogeneous layer, and encapsulating said iron oxide homogeneous layer with an outer layer that is selectively transparent to light directed thereon.

8. The method of claim 7, wherein the substrate is selected from the group consisting of mica, aluminum oxide, bismuth oxychloride, glass flake, silicon dioxide, iron oxide-coated mica, iron oxide-coated glass, titanium dioxide coated glass and titanium dioxide-coated mica.

9. The method of claim 8, wherein the substrate is platelet-shaped mica or glass.

10. The method of claim 8, wherein the substrate is platelet-shaped mica.

11. The method of claim 8, wherein the substrate is platelet-shaped glass.

12. The method of claim 7, wherein the first silver layer is deposited by electroless plating.

13. A cosmetic preparation containing a colorant wherein the colorant is a color effect material of claim 1.

14. A coating formulation containing a colorant wherein the colorant is a color effect material of claim 1.

15. A plastic formulation containing a colorant wherein the colorant is a color effect material of claim 1.

* * * * *